United States Patent [19]

Gladish

[11] Patent Number: 5,128,569
[45] Date of Patent: Jul. 7, 1992

[54] LINEAR INDUCTION MOTORS

[76] Inventor: Herbert E. Gladish, P.O. Box 3521, Station C,, Ottawa, Ontario, Canada, K1Y 4L5

[21] Appl. No.: 691,234

[22] Filed: Apr. 25, 1991

[51] Int. Cl.$^5$ ..................... H02K 41/00; B65G 15/60
[52] U.S. Cl. ........................................ 310/12; 310/90; 198/811; 198/805; 29/596
[58] Field of Search ................... 310/12, 90, 58, 59, 310/60 R, 61, 62, 63, 60 A; 198/811, 821, 823, 805; 104/290, 291, 292; 108/51.1, 56.1, 56.3; 29/596

[56] References Cited

U.S. PATENT DOCUMENTS

| | | | |
|---|---|---|---|
| 4,489,825 | 12/1984 | Gladish | 198/811 |
| 4,550,823 | 11/1985 | Gladish | 198/805 |
| 4,579,320 | 4/1986 | Gladish | 267/140.1 |
| 4,616,960 | 10/1986 | Gladish | 406/88 |
| 4,687,079 | 8/1987 | Gladish | 188/268 |
| 4,838,169 | 6/1989 | Gladish | 104/23.2 |
| 4,887,706 | 12/1989 | Gladish | 198/774 |

FOREIGN PATENT DOCUMENTS

| | | | |
|---|---|---|---|
| 0242162 | 10/1988 | Japan | 310/12 |
| 0074144 | 3/1990 | Japan | 310/12 |

Primary Examiner—Steven L. Stephan
Assistant Examiner—Judson H. Jones
Attorney, Agent, or Firm—Jones, Tullar & Cooper

[57] ABSTRACT

Improvements in the primary and the secondary of linear induction motors for a SAILRAIL air bearing support and conveying systems increase the efficiency of such systems. In the primary the core includes a plurality of laterally adjacent toothed laminations with the edges of the teeth being complementarily curved to the curvature of the rail. The electrical windings extend around air ducts formed in the primary, improving cooling. Additional cooling is achieved by bleeding air to vertical nozzles in the core, the cooling bleed air also helping to support a runner as it passes over the primary. The secondary is provided in the runner and includes two sets of curved flexible plates held in a pocket in the runner adjacent the operating surface thereof. The inner plates are ferromagnetic and the outer plates are copper or aluminum and are generally wider than the inner plates. The inner plates can be made up of a plurality of adjacent sections with adjacent sections being connected together by a flexible tape or by a narrow tongue or linking section of the plate material.

26 Claims, 7 Drawing Sheets

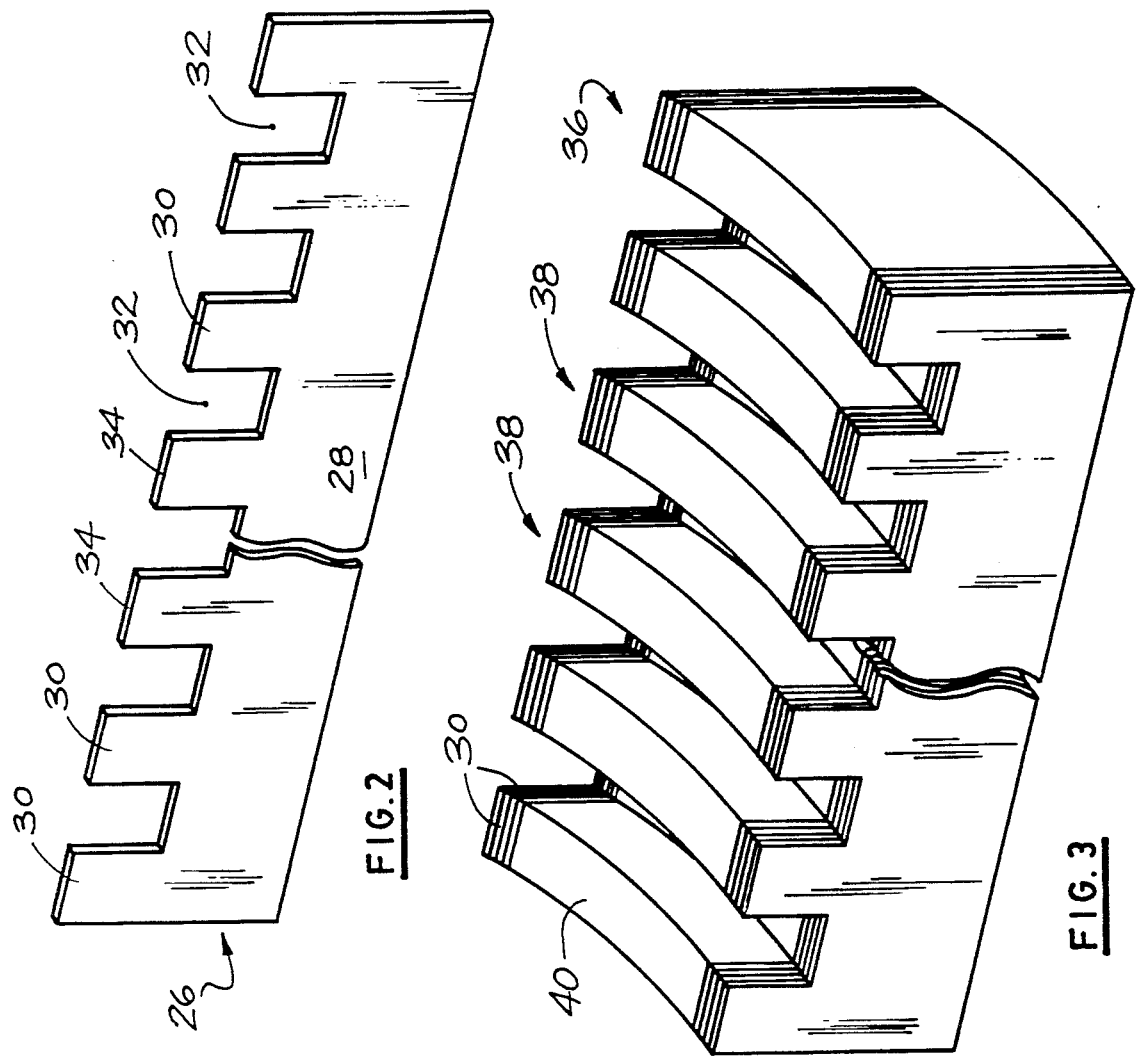
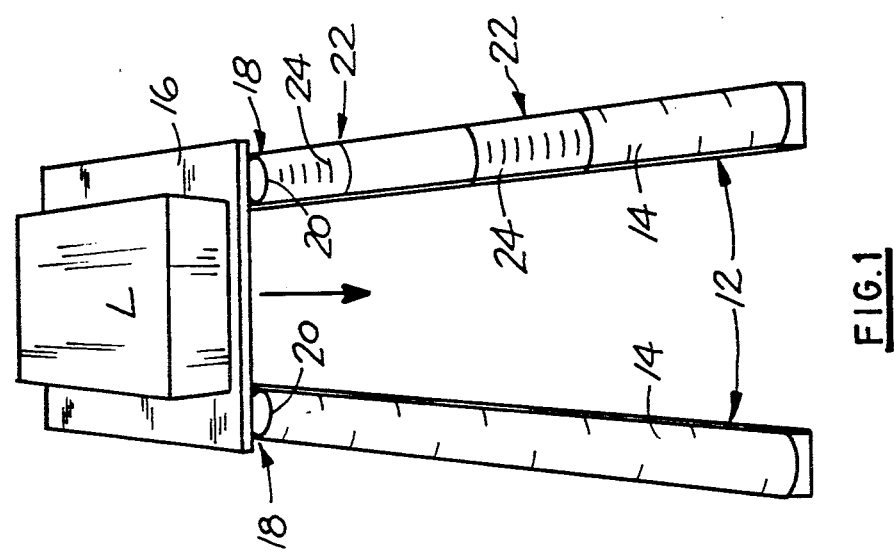

LINEAR INDUCTION MOTORS

The present invention relates to linear motor technology in general and to improvements in such technology for air bearing support and conveying systems in particular.

BACKGROUND OF THE INVENTION

The linear induction motor (LIM) concept is over one hundred years old, but only in recent times has its use grown significantly, due mainly to improvements in solid state control technology. However, LIM efficiencies have remained very low and, generally, its potential to provide great thrust power has been limited by its inability to handle heat generated by maximum electrical currents which lead to thermal breakdown of the LIM winding insulation, and magnetic losses from large air gaps imposed by physical constraints of the LIM system.

Air bearing support and conveying systems available under the SAILRAIL trade-mark can uniquely overcome these particular LIM problems. As will be described hereinafter the magnetic air gap of the LIM can be minimized by relying on the air-film suspension feature of the SAILRAIL guided hydrostatic complaint bearing, and the compressed air supplies of the SAILRAIL rails can be ducted through the LIM windings to enable the utilization of very high currents and thereby realize very efficient thrust powers.

Air bearing support and conveying systems available under the SAILRAIL trade-mark generally involve a parallel pair of rails, each having a transversely concave upper surface, appropriate air ducts or ports running the length of the rails and small diameter nozzles extending through the body of the rail at an angle to the upper surface and to the longitudinal axis of the rail. The nozzles are connected to the air ducts so that pressurized air can be directed from the air ducts through the nozzles to the upper surface. A system of valves and sensors is arranged along the rails so that groups of the nozzles are pressurized only in a specific desired sequence.

A load to be carried in a SAILRAIL system may be supported by a standard pallet which in turn is supported on a rectangular deck to which is attached a number of complaint runners, there being at least one runner for each rail. When pressurized air is exiting from the rail nozzles any runner thereabove will be levitated above the rail, spaced therefrom by an air-film gap of a few millimetres in thickness, the levitation system acting as an air bearing. The air-film supported load can be moved along the rails with a gentle push by hand, by gravity, or by other suitable means. The angled nature of the nozzles reduces the entry losses to the rail/runner air gap and the air exiting the nozzles at an angle aids in the removal of dust or dirt particles that may have settled in the rail. Braking can be effected by shutting off the air flow to bring the runners into contact with the rails, although this braking method is preferred for emergencies rather than for normal operation.

Another mechanism for achieving forward movement and braking of the runners is the linear induction motor (LIM). It has already been suggested, as in U.S. Pat. Nos. 4,489,825; 4,616,960 and 4,887,706, that the rail could contain the primary of a linear induction motor and that the runner could contain the secondary of such a motor (or vice versa). It has also been suggested that the secondary could include one or more copper plates which conform generally to the curvature of the runner's lower surface.

SUMMARY OF THE INVENTION

The present invention represents specific improvements to LIM technology as applied to air bearing support and conveying systems of the SAILRAIL type, especially at high speeds and over long distances. In particular there are described herein improvements to the primary portion of the LIM, the secondary portion of the LIM, and the method of making both the primary and the secondary.

Operation of a LIM in a SAILRAIL environment is particularly enhanced when the primaries are included in the rail(s) and the secondaries are included in the runner(s) that move along the rail. It then becomes very convenient to control movement of the load by sequentially energizing the primaries, spaced apart along the rails, to impart sufficient momentum to the runners to keep them, and the load carried thereby, moving along the rails. Energization of the primaries would be tied into the control system which controls sequential energization of the nozzles so that there is always an appropriate air bearing to support a load as the load moves along the rail.

As previously indicated the rail of a SAILRAIL system is transversely concave, although it is possible in other systems, such as in a monorail application, to have the rail transversely convex, as an elongated pipe. In the present invention the primary involves a core made up of a plurality of transversely adjacent ferromagnetic laminations, each lamination having a plurality of generally rectangular teeth along one edge thereof, there being a generally rectangualr gap or slot between adjacent teeth. The core includes a plurality of longitudinally spaced core teeth made up of the transversely adjacent lamination teeth. Furthermore, the laminations are arranged so that the free edge of the core teeth, defined by the free edges of the adjacent lamination teeth, has a transverse curvature that is complementary to the transverse curvature of the rail in which the primary will reside. The core teeth are electrically wound to create a plurality of core poles, with the windings of each third pole being electrically connected together to create three sets of windings along the length of the core. Each core pole will include a selected number, preferably three or four, of core teeth within the windings thereof. Means are provided for applying a polyphase electrical current to these windings.

Of primary importance to high performance of the LIM is the need to keep the primary cool during operation thereof, which operation is of short duration but involves considerable current overload. To this end, air duct means extend the length of the primary adjacent the core within the electrical windings of the core and connect to the air ducts or ports provided in the rest of the rail. The electrical wires creating the poles are directly cooled by the high pressure air flow as they extend around the air duct means for efficient heat dissipation at the zone of highest heating. The entire primary is encapsulated by a plastic material, such as an epoxy, so that the primary will have a transversely curved operating surface that is colinear with the transversely curved working surface of the rail. If desired for protection purposes there can be a thin layer of the encapsulating material above the curved free edges of the core teeth.

The air duct means can be provided in several ways. An air duct can be created by a hollow section of pipe or conduit of non-magnetic material positioned alongside the core during winding and before encapsulation takes place. Cooling is effected by heat transfer from the core and wires through the encapsulating material and the pipe wall to the supply air flowing in the pipe. Alternatively, a rod or pipe is coated with a release agent prior to encapsulation and is positioned in the desired orientation before winding takes place. After the encapsulating material has cured the rod or pipe is withdrawn leaving an air duct formed in the encapsulating material yet another alternative involves the lost wax (or similar) process wherein, after winding, the wires around rods adjacent the core, the rods are removed and replaced by molten wax which fills the vacated area and penetrates the interstices between the wires before hardening. After encapsulation the wax is removed, leaving the air duct means defined by the vanished wax and exposing many of the wires directly to the cooling air passing along the duct. With these embodiments heat transfer is more direct to the air flowing in the duct and a more efficient cooling environment is provided.

The secondary in accordance with this invention is provided in the compliant runner. Various types of runners have been devised for SAILRAIL systems, as exemplified in U.S. Pat. Nos. 4,489,825; 4,5506,823; 4,579,320; 4,687,079 and 4,838,169. The secondary of this invention will work with any of those runners, the runners being generally defined as including a longitudinally extending core, an enclosing cover, and a filler material in the cavity between the core and the cover. At least the filler and the cover are formed from materials that are capable of deformation under load and at least partial recovery after the load has been removed.

The LIM secondary of this invention comprises, first of all, a generally rectangular pocket cut into the filler material in close proximity to the transversely curved operating surface of the cover, that being a surface that is complementary to the rail's working surface. The pocket contains at least two sets of thin, transversely curved, stacked plates. The innermost set of plates are ferromagnetic, and the outermost set, adjacent the cover, are malleable, electrically conductive and non-ferromagnetic. Also, the outermost plates have a width that is greater than that of the innermost plates, so that the outermost plates extend laterally beyond the innermost plates.

Preferably, for improved magnetic interaction, and for improved flexibility at least the innermost plates will be interrupted longitudinally as by transverse or angled cuts therethrough, adjacent sections of each plate being taped together. Preferably also the plates are cut so that the spaced apart cuts of the stacked plates are staggered between adjacent plates for magnetic continuity.

During manufacture of the primary the transversely curved configuration of the core teeth is achieved by first of all assembling the laminations in a transversely abutting relationship and then bringing the free edges of the lamination teeth into contact with a transversely curved, longitudinally extending forming member, the curvature of which is complementary to that of a rail. Once the transverse curvature has been established the laminations are clamped or bolted together and then winding of the core teeth around the air ducts, followed by encapsulation, can take place.

The primaries in accordance with this invention can be located at any desired positions along the length of the rails. Furthermore, the primaries can be configured so that they can plug directly into the ports or air ducts of the rails to make modular assembly of the rails convenient and easy. Alternatively, the primaries can be provided with end plates for connection to appropriate splines or other connecting members provided with the rails.

Other features of the present invention will be described hereinafter and with reference to the drawings.

BRIEF DESCRIPTION OF THE DRAWINGS

FIG. 1 is a perspective view of a SAILRAIL support and conveying system showing a rail incorporating several LIM primaries in accordance with this invention;

FIG. 2 is a perspective view of a lamination used in the primary of this invention.

FIG. 3 is a perspective view of a primary core made up of a plurality of laminations.

DESCRIPTION OF THE PREFERRED EMBODIMENT

Figure 4A:
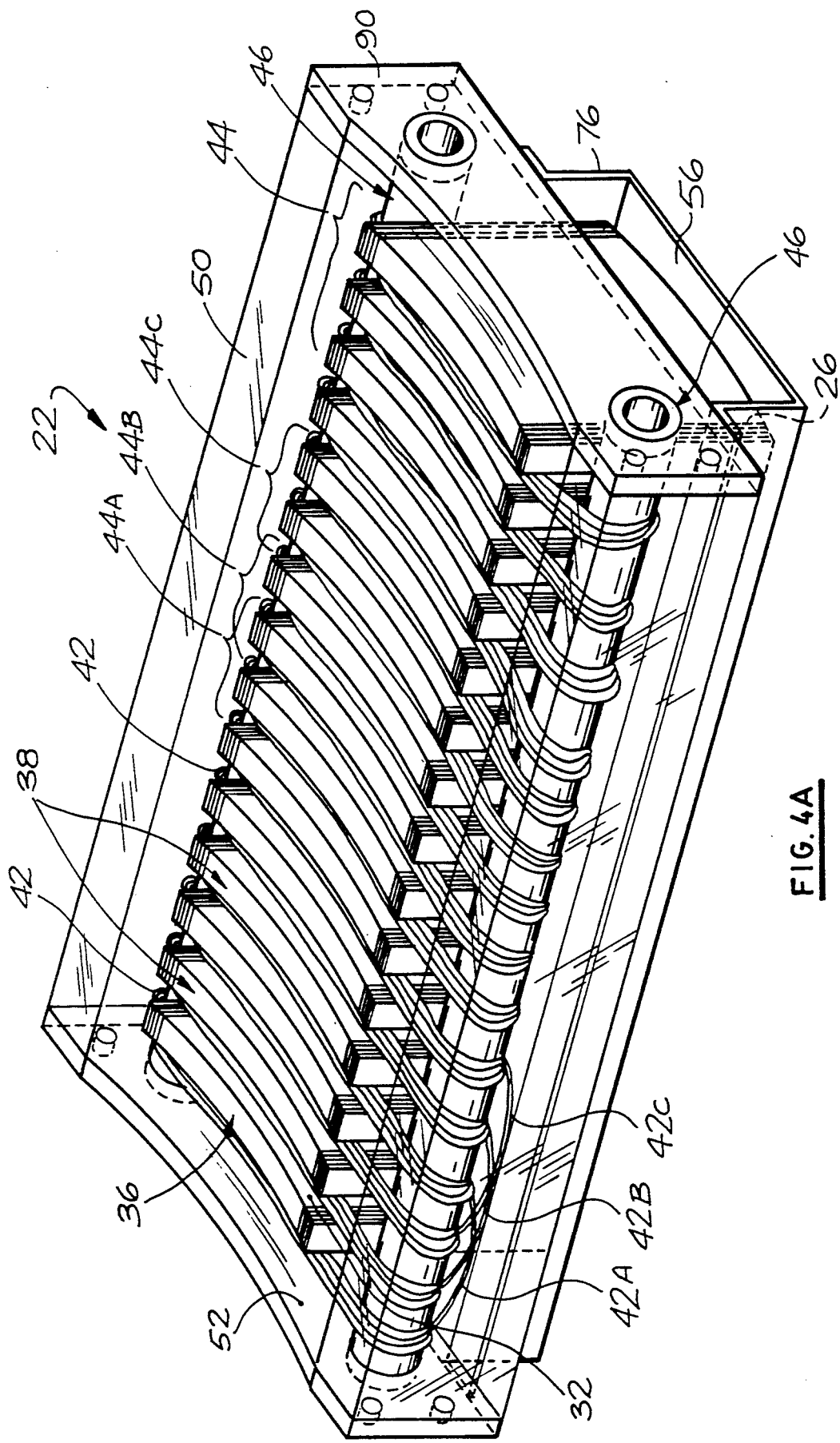
FIG. 4A is a perspective view of a complete primary with transparent encapsulation.

FIG. 1 shows, very generally, a SAILRAIL air bearing support and conveying system 10 incorporating a pair of parallel rails 12, each having a transversely concave upper working surface 14. A plurality of longitudinally spaced angled nozzles extend through the surface 14 to pass pressured air from longitudinally extending ducts within the rail to the surface 14. The ducts and the nozzles are not shown in FIG. 1, the nozzles being too small to be visible in the rails as seen in the figure.

A load L is shown as resting on a deck 16 which in turn is supported by a pair of runners 18 which extend the length of the deck and are received in a corresponding rail 12. As can be seen the runner 18 has a transversely convex lower operating surface 20 that is complementary in curvature to the rail working surface 14.

FIG. 1 also shows a pair of spaced apart LIM primaries 22 located in one of the rails 12. As can be seen the primaries 22 have an upper transversely curved working surface 24 that is colinear with the working surface 14 to ensure a smooth transition of a runner 18 as it travels along the rail from a primary section to a normal rail section and vice versa.

The bulk of each primary will entail a plurality of thin ferromagnetic laminations 26, one of which is seen in FIG. 2. Therein it is seen that the lamination 26 has a longitudinally extending main body 28 and a plurality of generally rectangular teeth 30 along one edge thereof. Adjacent teeth are separated by a generally rectangular slot or gap 32. Each tooth 30 has an outer free edge 34.

A plurality of the laminations 26 is assembled together, as will be discussed later, to form a core 36, the core having a plurality of core teeth 38 which are formed by the laterally adjacent lamination teeth 30. As is seen in FIG. 3 the free edge portion 40 of each core tooth 38 has a transverse curvature that is complementary to the transverse curvature of a rail 12, whether the curvature be concave as shown, or convex.

FIG. 4 shows a completed primary 22 in accordance with this invention. For the sake of simplicity all of the individual laminations 26 making up the core 36 are not shown and the encapsulating material is shown as being transparent so that internal details can be seen.

The core 36 is shown first of all as having electrically conductive material 42, such as fine copper wire, wound about a selected number of core teeth 38, the windings being located in the slots 32. Preferably there will be three or four core teeth 38 contained within each winding, creating a core pole 44. In the drawing three core teeth are contained within each core pole 44 and, furthermore, it is seen that there are three distinct sets of core poles, 44A, 44B and 44C created as successive groups of three core teeth 38 are wound. The windings of every third core pole are electrically connected together, as by connecting wires 42A, 42B and 42C so that all of the 44A core poles are connected together, all of the 44B core poles are connected together and all of the 44C core poles are connected together. Each set of core poles will be connectable in a suitable manner (now shown) to a source of polyphase electrical current.

One major problem with a LIM, especially when high amperage is involved, is the dissipation of heat generated electrically within the primary mostly at the base of the core slots. With this invention it is possible to air cool the primary using the high velocity flowing pressurized air that is normally available within the SAILRAIL rail. To that end the primary of this invention provides air duct means 46 alongside the core 36, which air duct means are open at each end and are connectable to the corresponding air ports of the standard rail section. Preferably the windings of the core poles 44A, 44B, 44C will pass around the air duct means 46 so as to help dissipate more heat than would be possible if they did not pass around the air duct means.

FIG. 4 shows the entire primary 22 as including an encapsulation medium 50, giving the primary 22 its overall external shape. That shape, as shown, allows the primary to be integrated exectly into a SAILRAIL rail. Thus, as indicated, the air duct means 46 will be connected to the supply air duct sections of the rail, ensuring continuous availability of pressurized air along the rail, and the working surface 52 of the primary will be exactly colinear with the surface 14 of the rail 12 so as to provide a smooth transition for a runner as it passes along the rail and over a primary. Of course, suitable means for connecting the primary to the rail will have to be provided, and such will be discussed hereinafter.

As indicated previously the dissipation of heat generated during operation of the primary is a major concern for a high performance LIM, the air duct means 46 helping to remove a good portion of such heat. As seen in FIG. 5, additional, direct, cooling of the core can be obtained by bleeding air from the air duct means 46 via channels 54 to a thin air space 56 below the core. The core is provided with several generally vertically oriented small diameter air passages 58 which pass pressurized air from the air space 56 to outlets or nozzles 60 at the surface 52. Air flowing in the passages 58 will help with cooling of the core, and furthermore, air exiting the nozzles 60 will create an air bearing support for the runner as it passes over the primary. The transit time of a runner over the primary will be relatively short, perhaps in the order of a second, and hence the configuration and orientation of the nozzles 60 need not be as critically determined as for the standard rail sections.

Figure 6:
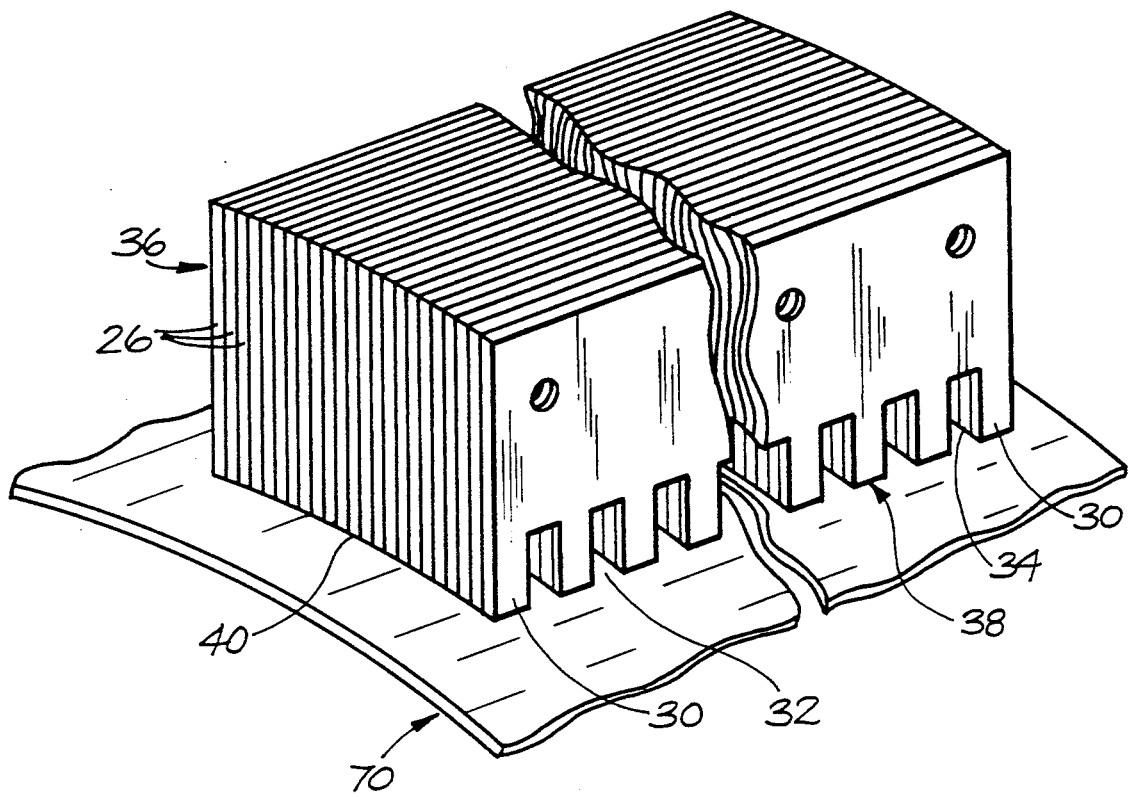
FIG. 6 is a perspective view of a forming member with adjacent laminations as part of the method of this invention.

FIG. 6 shows, in perspective how one can produce a core 36 having the desired transverse curvature of the free edge portion 40 of the core teeth 38.

Initially, one loosely assembles together the desired plurality of laminations 26 so that the adjacent teeth 30 thereof are transversely aligned, as are the slots 32. One then brings the free edges 34 of the teeth 30 into contact with a forming member 70 which has a transverse curvature substantially identical to that of a SAILRAIL rail 12. With the center lamination being radially aligned on the member 70 and all of the laminations extending longitudinally thereof the laminations can then be shifted towards the member 70 until all of the free edges 34 are in contact with the member's surface. The laminations are then tightly clamped or bolted together to hold them in position, the free edges 34 now defining the core teeth 38 that have the transversely curved free edge portion 40 complementary to the curvature of the rail's working surface. If desired, the laminations can be subjected to a vacuum to ensure firm intimate contact between adjacent laminations.

The clamped core can then be placed in a suitable jig so that the air passages 58 can be drilled therein. If drilling is inconvenient or undesirable (cold welding of adjacent laminations could result), it would be possible to have the center lamination suitably sectioned by vertical or angled cuts with the sections suitably spaced such that the gap between adjacent sections defines the air passage 58.

Figure 5A:
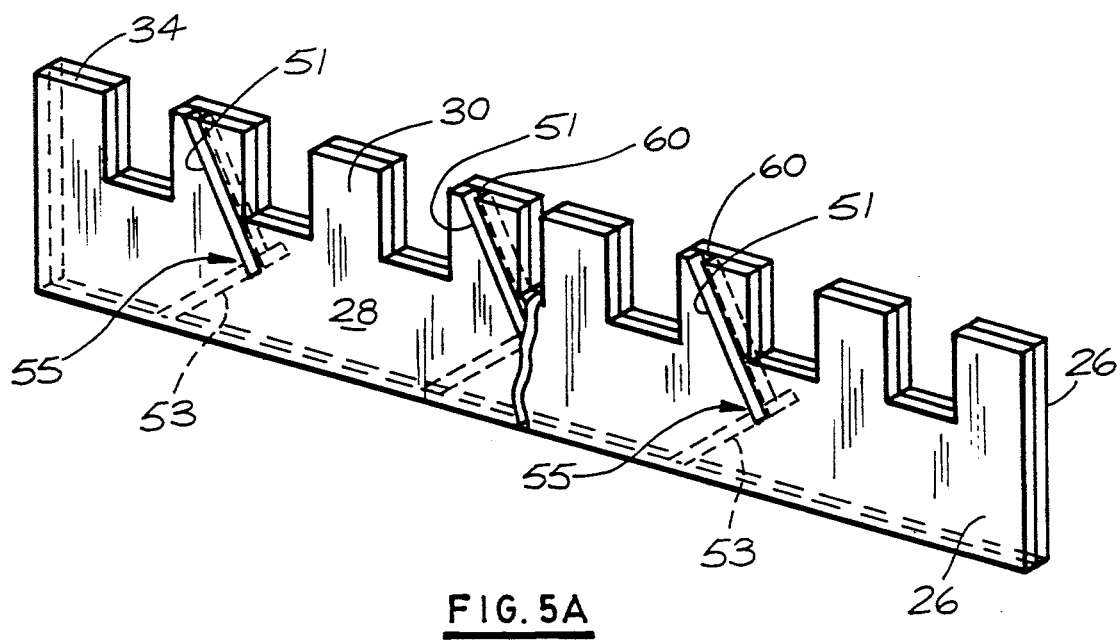
FIG. 5A is a view showing one way of providing nozzles in the core laminations.
Figure 5:
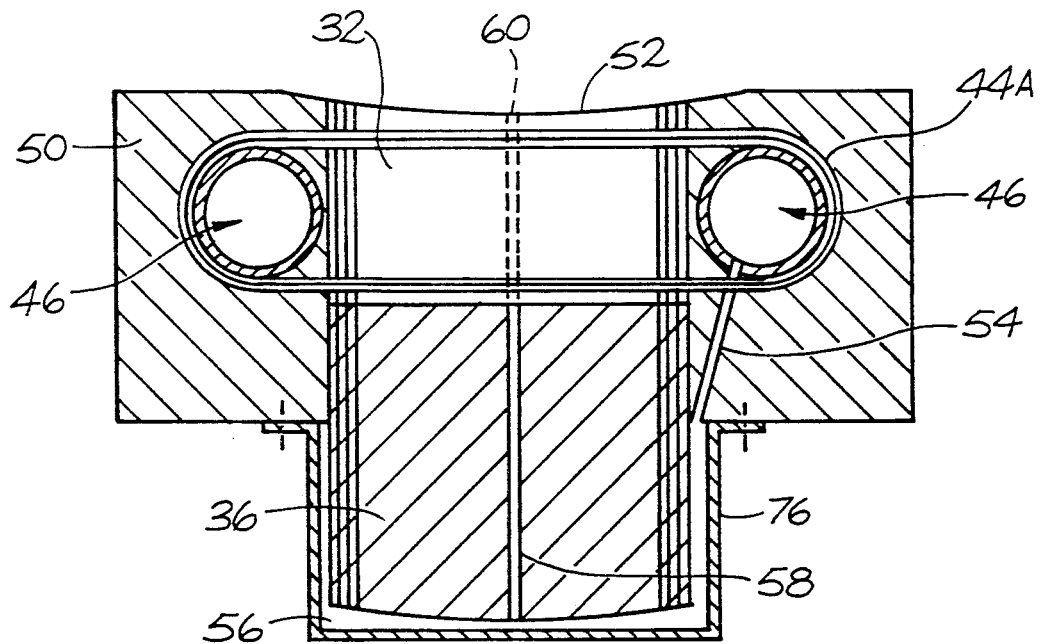
FIG. 5 is a vertical cross-sectional view taken transversely between a pair of core teeth of the primary.

FIG. 5A shows, in perspective, another way in which air can be passed from the air space 56 to nozzles 60 without disrupting the magnetic integrity of the core. In this case one of the laminations 26 is provided with longitudinally spaced apart angled slots 51 leading from the upper edge 34 of a tooth 30 into the body 28. The adjacent lamination is provided with oppositely directed angled slots 53 leading from the bottom edge 55. The slots 51,53 are positioned so as to overlap in the zone 55. Air from the air space 56 will pass along the slots 53 and then pass to the slots 51 at the zone 55 and then pass along the slots 51 to the nozzles 60. Adjacent laminations create distinct passageways with the slots 51, 53 by providing closed sides therefor. This mechanism for moving air through the core avoids post-assembly drilling or the necessity of assembling a sectioned lamination into the core.

Figure 7:
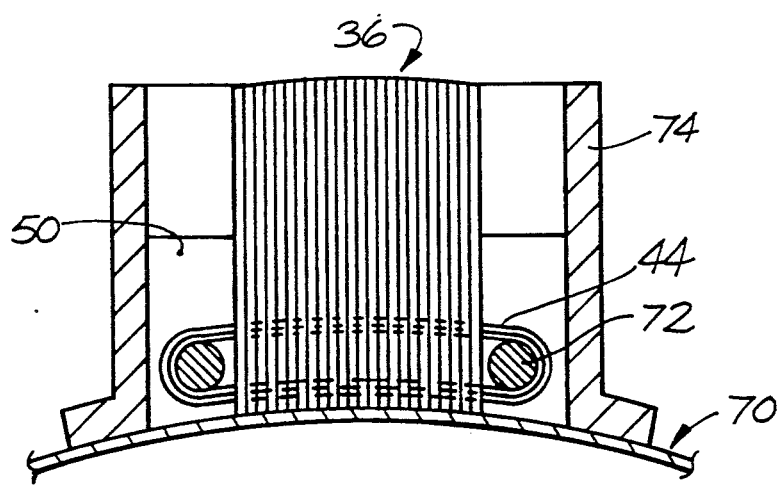
FIG. 7 shows transverse section of the primary in position for encapsulation.

If conduit-type air duct means 46 are to be used they will be positioned lengthwise adjacent the core 36 and then the core teeth 38 will be wound with the winding passing around the air duct means as seen in FIG. 4. It is preferable, however, to have heat transfer from the wires and the core to the air in the air duct means as direct as possible, Thus, it is preferable to avoid the additonal barrier posed by the wall of a conduit-type air duct. This can be accomplished by longitudinally positioning pipes or rods 72 alongside the core 36 (FIG. 7) with each pipe or rod 72 being liberally coated with a release agent appropriate to the encapsulating medium.

The wound core with the air duct defining means in place is returned to the forming member 70 and is placed within a suitable mold 74 which will give the primary its final outer shape. Then the encapsulating material 50, preferably an epoxy having a high index of thermal conductivity is poured into the mold 74 to surround the wound core and the air duct defining means. The encapsulating material should not cover the bottom surface of the core, leaving that surface exposed and avoiding seepage of any material into the air passages 58. If pipes or rods 72 were used to define the air duct means 46 they can be easily removed, due to the release agent, after the encapsulating material has cured, leaving a cylindrical passage on each side of the core for more efficient cooling of the primary.

After curing, the primary is removed from the mold 74 and any machining necessary to finalize the shape thereof can be performed. Preferably the tooth surfaces 40 will be exposed to the atmosphere with the material 50 in the slots 32 just filling those slots to the level of the surfaces 40. However, it is acceptable if there is a thin covering of encapsulating material on the surfaces 40 but the covering should be less than a millimetre. The thin covering can be provided by placing a thin sheet of material, such as paper, on the forming member 70, before the wound core is placed in the mold 74. Before the encapsulating material is poured into the mold the sheet of material is carefully removed, creating the desired gap to be filled with the encapsulating material to thereby create the thin covering.

A bottom cover 76 can then be secured to the underside of the encapsulated primary to help define the air space 56 between it and the bottom of the core 36. Before securing the cover in place a few bleed holes 54 can be drilled into the air duct means 46 to provide pressurized air to the space 56. If the encapsulating material 50 is transparent there should be little fear of drilling into any of the electrical windings. To avoid such problems short wooden dowels could be positioned in the primary before encapsulation, in the desired orientation, defining a path for the bleed holes 54. After curing one could drill along the dowels for ease of drilling and to ensure that the drill bit does not encounter any windings. Of course, the cover 76 should be peripherally sealed to the primary to avoid unwanted leakage of the pressurized air. Furthermore, it would be possible to directly pressurize the space 56 from the air flowing in the rails, thereby avoiding the dangers inherent in drilling the bleed holes 54.

Figure 8A:
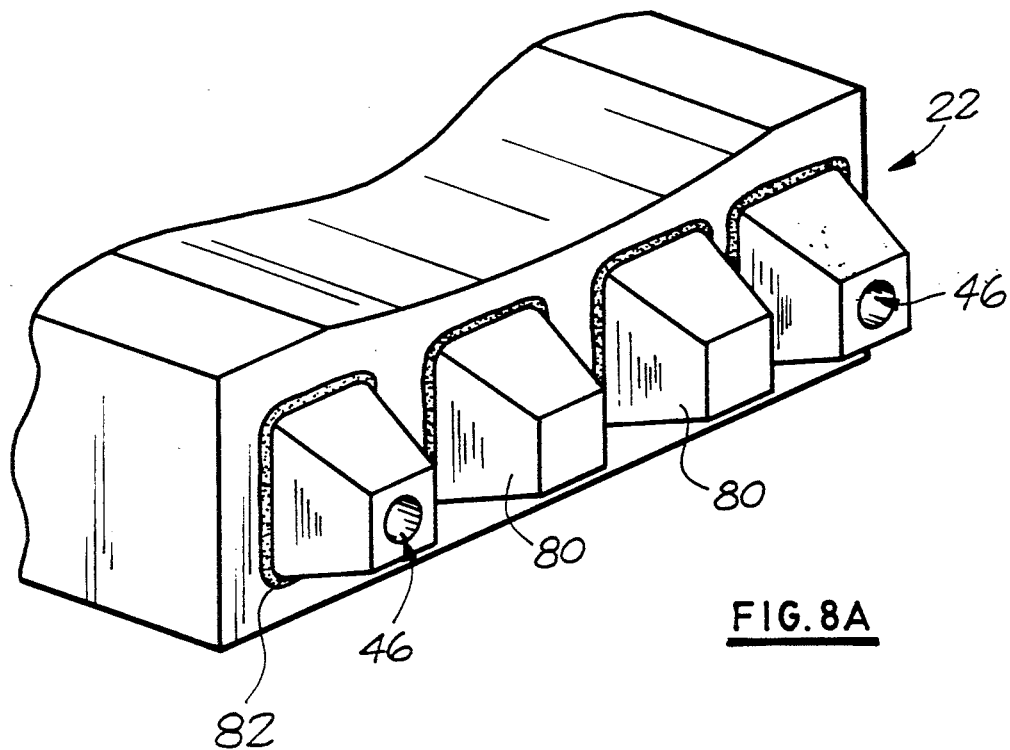
FIGS. 8A and 8B show two ways in which a primary can be connected to a SAILRAIL rail.
Figure 8B:
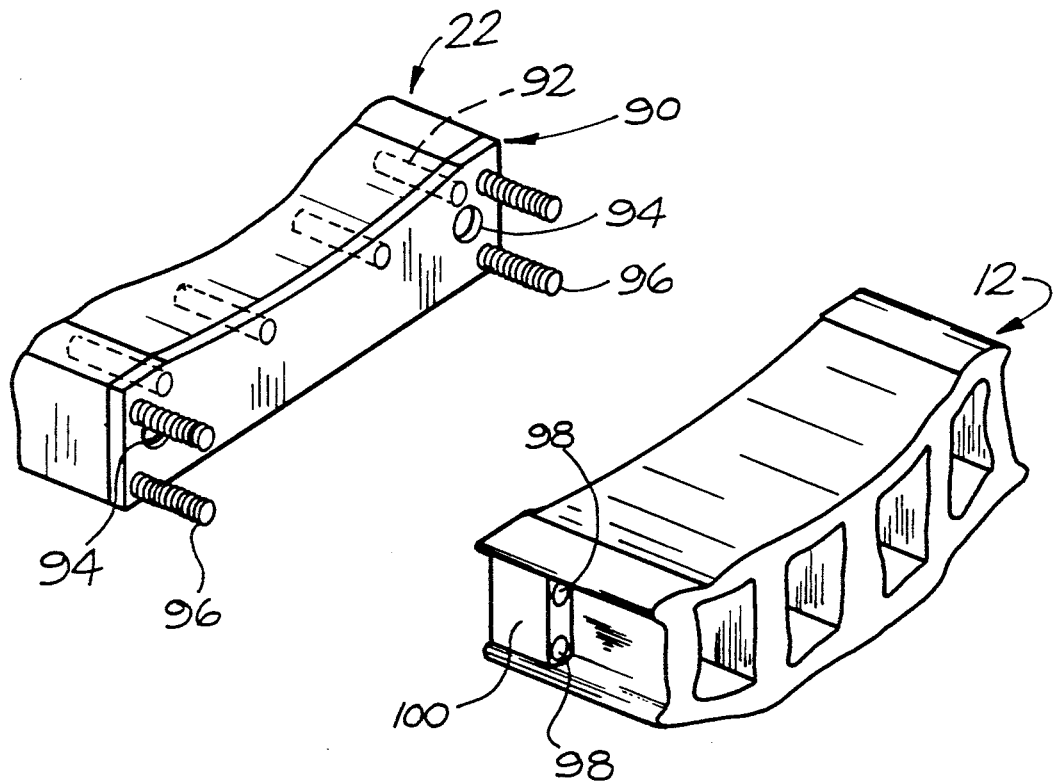

The end faces of the primary 22 can take several shapes, two of which are shown in FIGS. 8A and 8B. In the configuration of FIG. 8A the mold 74 includes portions which define tapered plug extensions 80 at the end face of the primary. Each extension 80 is dimensioned for a tight fit within the mating port of a rail 12. In fact, portions of a rail section could be used as end dams of the epoxy mold 74. The two outermost extensions 80 carry the suitable air duct defining means. In the case of a conduit-type defining means each conduit will extend to the end of the appropriate extension 80 (or slightly beyond) to ensure clear passage from end to end. In the case of air ducts produced by removable pipes or rods 72 the pipes or rods will extend beyond the ends of appropriate extensions 80 through holes in the end dams of the mold so that they can be easily withdrawn after cure, leaving the air duct means 46 intact. An O-ring 82 will be provided around each extension for sealing purposes.

If a more positive connection between primary and rail is desired then the mechanism of FIG. 8B could be employed. An aluminum plate 90 has its upper edge conforming to that of the primary 22 and is positioned at each end of the primary in the mold 74. Each plate 90 has a plurality of threaded studs 92 extending inwardly to anchor the plate to the encapsulating material after cure. Each plate also has a pair of openings 94 through which the appropriate air duct defining means (conduit, pipe or rod) can extend before the encapsulating material is poured into the mold 74. The end plates 90 could be used as end dams for the mold 74 to simplify molding and to ensure a firm anchor for the studs 92.

Each plate 90 is also provided with a pair of vertically aligned outwardly projecting studs 96 at each side thereof. These studs 96 can pass through mating bores 98 in spline connectors 100 which are permanently provided at each end of all SAILRAIL rail sections and are normally used to connect such sections together. The studs 96 are then bolted to the connectors 100 to affix the primary to a mating rail section.

Another mechanism for creating the air duct means involves winding the electrical wires around suitable rods alongside the core 36 as described previously, and then removing the rods. The windings will be self-supporting and will not collapse. The elongated cavity vacated by each rod is filled with a molten wax or foam material which penetrates the interstices between the wires and then hardens. After encapsulation the wax, foam or other suitable material is heated or dissolved for removal from the primary, leaving the defined air ducts behind. One advantage of this procedure is that the wires adjacent the ducts are exposed directly to cooling air passing along the air ducts.

Having described the improvements of the primary of a LIM for a SAILRAIL system it is now appropriate to describe the improved secondary, reference being made to FIGS. 9 to 11B for such description. Herein, the runner to which the secondary is to be applied is going to be illustrated in a somewhat generic sense. It can be appreciated that there are several varieties of SAILRAIL runner available and it should also be appreciated that the improvements to the LIM secondary are equally applicable to each variety of runner.

Figure 9:
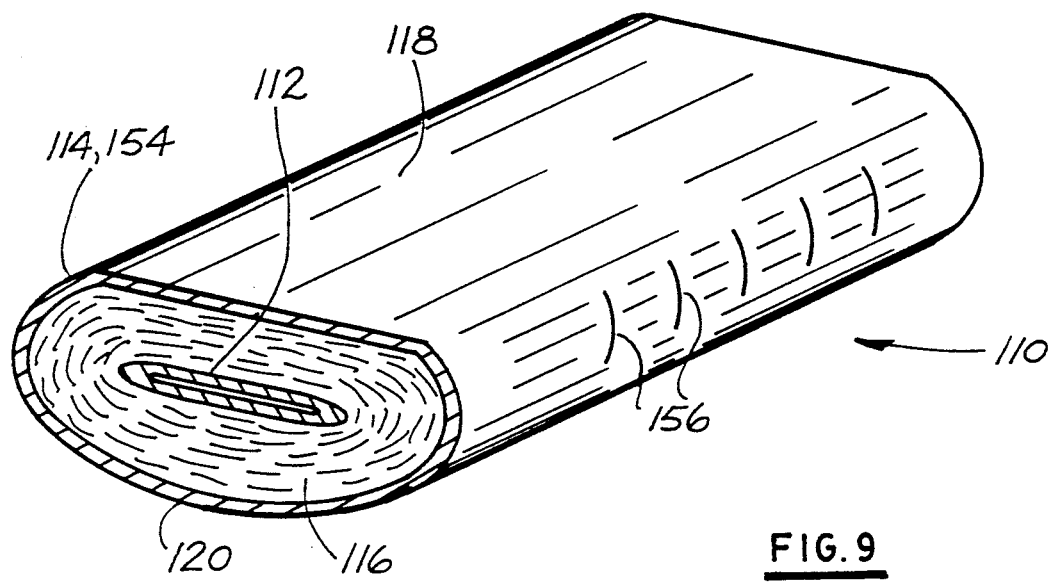
FIG. 9 shows a generic runner, the end thereof being removed to show the interior.

A generic runner 110 is shown in FIG. 9 as being elongated, somewhat oval in cross-section and open at each end. With reference to sectional view FIG. 9 it will be seen that the runner has a longitudinally extending internal core 112, an external surrounding cover 114 and a filler material 116 in the space between the core and the cover. The filler material and the cover material are such that they will deform under load and are capable of at least partial recovery after the load has been removed.

The runner 110 is similar to the runner 18 shown in FIG. 1. It has a somewhat flattened upper surface 118 on which a deck, such as a deck 16, is supported. It also has a lower transversely curved operating surface 120 which is generally complementary to the working surface 14 of the rail 12.

Figure 10:
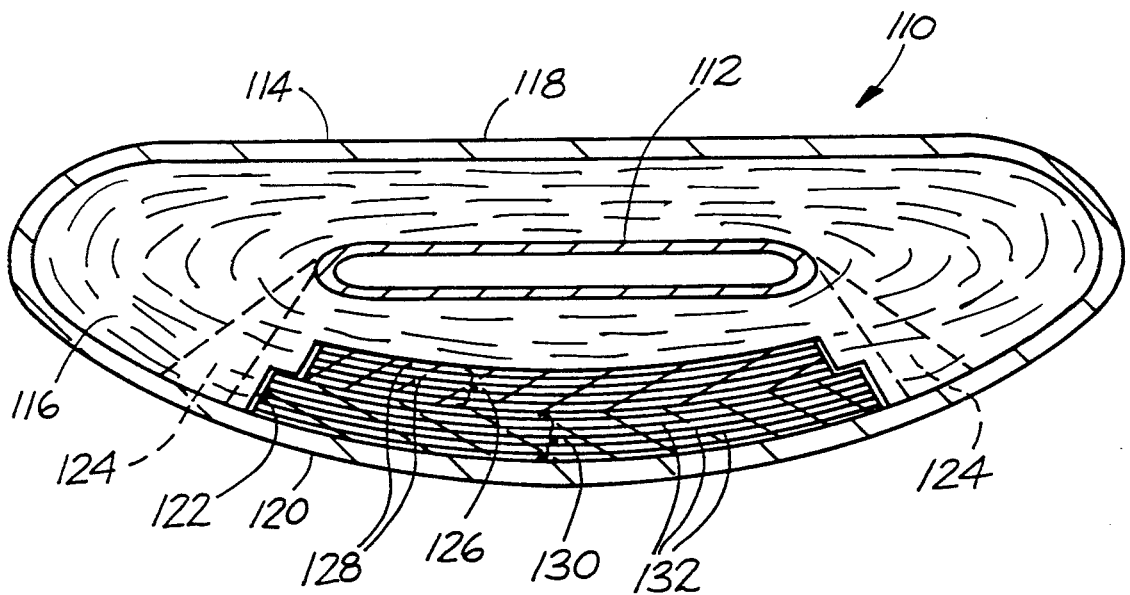
FIG. 10 is a cross-sectional view of a runner showing the secondary plates therein.

Referring to FIG. 10 it will be seen that the runner 110 is provided with a longitudinally extending, generally rectangular pocket 122 cut into the filler material 116 adjacent the operating surface 120 of the cover 114. The pocket will be extended over most of the runner's length (usually about 1.2 m) and its width will be less than that of the operating surface. Any SAILRAIL runner has a pair of so-called "seal" areas 124 extending along the operating surface 120 inside the outer edges of the runner. The filler material in these seal areas 124 is somewhat firmer or more heavily compressed, than the rest of the filler material and it is important that these seal areas be maintained for optimum runner performance. Thus the pocket 122 should not extend laterally into the seal areas.

Within the pocket 122 at least two sets of stacked pluralities of transversely curved laminations or plates are positioned. The first or innermost set 126 involves a plurality of thin, ferromagnetic plates 128. The second or outermost set 130 involves a plurality of thin, flexible or malleable, electrically conductive, nonferromagnetic plates 132, which plates extend laterally beyond the lateral edges of the plates 128. Preferably the plates 128 are formed from iron or steel while the plates 132 are formed from copper or aluminum. The primary creates a moving magnetic field which induces corresponding electrical currents in the copper plates. These currents have their own magnetic fields which are enhanced by the adjacent steel plates. The transverse current flow in the copper plates are important to the magnetic forces while the longitudinal currents which circulate along the longitudinal edges are not important. By extending the outermost plates laterally beyond the innermost plates the longitudinal currents are kept away from the innermost plates and hence the available magnetic forces are maximized.

Figure 11A:
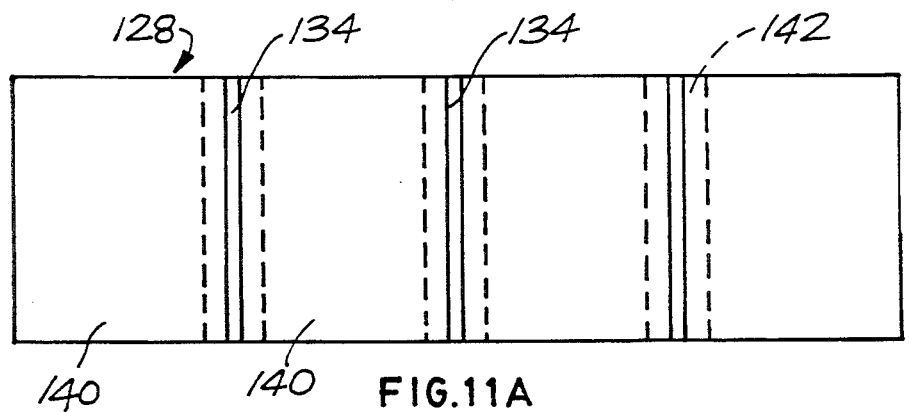
FIGS. 11A, 11B, 11C and 11D show plan views of four types of plates that may be used in the secondary of this invention.
Figure 11B:
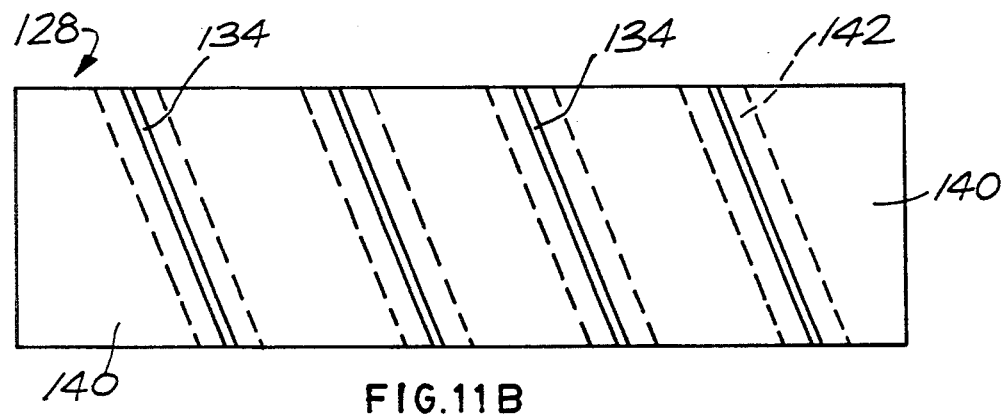

For enhanced flexibility operation of the ferromagnetic plates 128 can be provided with full longitudinally spaced cuts (at a spacing of about 20 cm), transverse as at 134 in FIG. 11A, or angled as at 136 in FIG. 11B. The spacing between the slits or cuts will correspond generally to the pitch or a multiple thereof of the primary poles 44. Adjacent sections 140 of the plate 128 are taped together as by adhesive tape 142 so that the individual sections 140 will not shift due to magnetic forces and so that the entire plate can still be handled satisfactorily during assembly. Preferably, the spaced apart cuts of the stacked plates are staggered between adjacent plates for magnetic continuity.

Figure 11C:
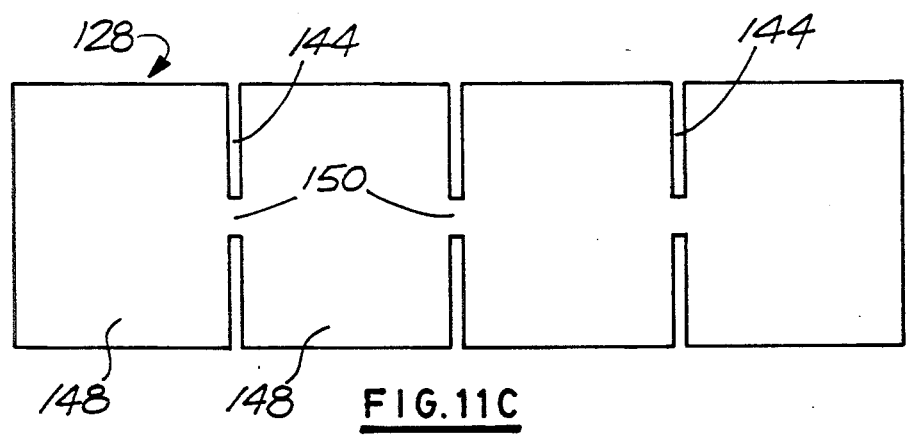
Figure 11D:
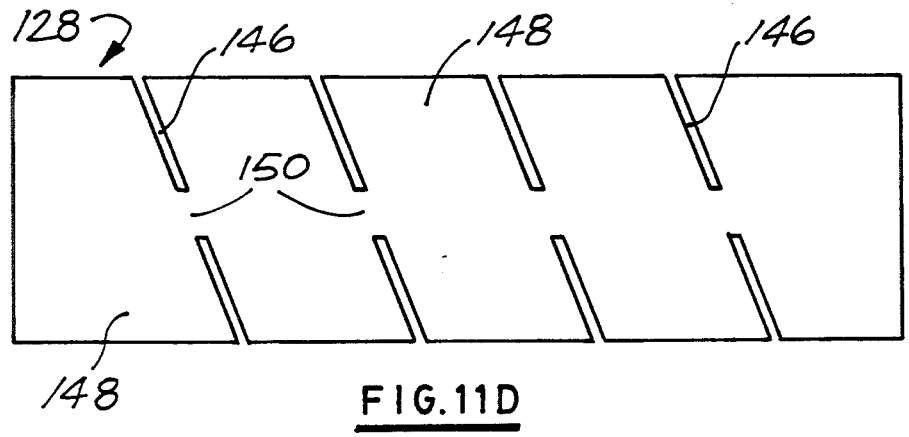

Another alternative is shown in FIGS. 11C and 11D wherein the plates 128 are sectioned by partial cuts, transverse as at 144 in FIG. 11C or angled as at 146 in FIG. 11D. Adjacent sections 148 are connected together by axial portions 150. The spaced apart cuts 144, 146 of the stacked plates are staggered between adjacent plates for magnetic continuity. Also, it is not necessary to tape over the cuts 144, 146 since the axial portions 150 maintain continuity between the adjacent sections 148.

Additional improvements in efficiency can be achieved if the cover 154 (FIG. 12) is formed of hardened thin sheet copper or aluminum with all rail interface areas covered by a low friction epoxy material. For additional flexibility angled side cuts or slots 156 can be provided in the cover 154.

There are many advantages to using a LIM system, and especially one incorporating the improvements herein, in a SAILRAIL air bearing support and conveying system. Because the secondary is extremely close to the primary during operation, the air-film suspension automatically acting as a pressurized air gap, magnetic losses are minimized and the attractive forces are fully accommodated. The electrical power requirements (service factors) are maximized due to the exceptional cooling provisions and very high thrust power can be achieved. There is a minimum amount of wear to the rail or the runner, or requirement for lubrication, since an air gap is always present and there are no moving parts in the primary or the secondary. For the same reason the system is very clean and safe. It is also very quiet and movement of the runners along the rails is very smooth due to the vibration absorption properties of the runner filler and the large compliant footprint of the runner. Acceleration is achieved via the LIM, as is deceleration and braking, without the addition of other equipment. The synchronous speed of the LIM acts as an automatic speed control and increased braking when travelling downhill is obtained through reversing the thrust of the LIM or utilizing regenerative power fed back into the power source. The primary is provided as a module, allowing it to be easily positioned between any two sections of rail, plugging into the air ports thereof for continuous air flow. The secondary is light in weight and has little affect on the dynamics of the runner.

It is clear that the improvements to LIM's as described herein result in increased efficiency of LIM's in general and enable LIM's to be effectively used in the SAILRAIL system. The improvements are easily incorporated into the SAILRAIL runner and rail and result in enhanced operation of the system. While preferred embodiments of the invention have been described herein it is understood that variations thereon may occur to a skilled person in the art. Hence the protection to be afforded this invention is to be determined from the scope of the claims appended hereto.

I claim:

1. A primary for a linear induction motor, said primary being positionable in an elongated multiport rail that is part of an air bearing load support and conveying system, the rail having a transversely curved working surface, said primary comprising:

a primary core including a plurality of a longitudinally extending laterally adjacent, identical, thin ferromagnetic laminations, each lamination including a plurality of rectangular teeth extending along one longitudinal edge thereof with adjacent teeth being separated by a rectangular slot;

each tooth having a longitudinally straight free edge, said laminations being positioned relative to each other to define a plurality of longitudinally spaced core teeth composed of laterally adjacent lamination teeth, each core tooth having a transversely curved free edge portion complementary to the rail working surface and made up of the free edges of the laterally adjacent lamination teeth;

an electrical winding around selected numbers of said core teeth to create a plurality of separate, longitudinally adjacent core poles, the windings of every third pole being electrically connected together to define three individual sets of such poles over the length of said primary;

means for supplying polyphase electrical current to the windings of said sets of poles;

air duct means extending longitudinally on each side of said core and connectable to air duct sections of said rail;

a plurality of longitudinally spaced air passages extending through said core from an air space at the bottom of said primary to exit at said curved surface of said primary, there being bleed passages connecting said air space to said air duct means; and means encapsulating said core, said windings and said air duct means and having a transversely curved surface that is colinear with the curved working surface of said rail.

2. The primary of claim 1 wherein said electrical windings are directed around said air duct means.

3. The primary of claim 2 wherein each said air duct means is an annular conduit held in position adjacent said core by said encapsulating means.

4. The primary of claim 2 wherein each said air duct means is a generally cylindrical passageway extending through said primary from end to end thereof.

5. The primary of claim 1 when said air passages are defined by a plurality of spaced apart first angled slots extending into the body of a lamination from the bottom edge thereof and by a plurality of spaced apart oppositely angled second slot extending into the body of an adjacent lamination from the free edge of selected teeth thereof, individual first and second slots overlapping to create continuous air passages.

6. The primary of claim 1 including tapered plug means projecting from each end of said primary for a tight fit in corresponding ports of said multiport rail, said air duct means being aligned with corresponding ones of said plugs.

7. The primary of claim 1 including a connection plate at each end of said primary, said connection plate including anchor bolt means extending into said encapsulating means, aperture means aligned with said air duct means, and connecting bolt means engageable with connection spline means on said multiport rail.

8. A runner for use in conjunction with an alongated rail having a transversely curved working surface, as part of an air bearing support and conveying system, said runner including internal, longitudinally extending core means, outer enclosing cover means, and flexible compliant filler means between said cover means and said core means, said filler means and said cover means being formed of materials that are capable of deflection under load and at least partial recovery when the load is removed, said cover means having a transversely curved operating surface complementary to said rail working surface, characterized by an elongated generally rectangular pocket in said filler means in close proximity to said operating surface, and a secondary for a linear induction motor contained in said pocket, said secondary comprising an innermost stacked plurality of thin, transversely curved, ferromagnetic plates and, adjacent said cover means, an outermost stacked plurality of thin, transversely curved, malleable, electrically conductive, nonferromagnetic plates which are generally wider than said ferromagnetic plates.

9. The runner of claim 8 wherein said nonferromagnetic plates are formed form thin sheets of copper or aluminum.

10. The runner of claim 8 wherein each of said ferromagnetic plates comprises a plurality of longitudinally adjacent separate plate sections, adjacent plate sections being connected together by flexible tape means.

11. The runner of claim 10 wherein adjacent edges of adjacent plate sections are at about 90° to the longitudinal edges of such sections.

12. The runner of claim 10 wherein adjacent edges of adjacent plate sections are at an acute angle to the longitudinal edges of such sections.

13. The runner of claim 8 wherein each of said ferromagnetic plates includes a plurality of spaced apart cuts extending from the longitudinal edges thereof inwardly of the plate.

14. The runner of claim 13 wherein said cuts are at about 90° to the longitudinal edges of the ferromagnetic plate.

15. The runner of claim 13 wherein said cuts are at an acute angle to the longitudinal edges of the ferromagnetic plates.

16. The runner of claim 10 wherein the plate sections of adjacent ferromagnetic plates in said innermost plurality are staggered with respect to each other.

17. The runner of claim 13 wherein the cuts of adjacent ferromagnetic plates in said innermost plurality are staggered with respect to each other.

18. The runner of claim 8 wherein said cover means is formed of hardened copper or aluminum.

19. The runner of claim 18 wherein said cover means is provided with a plurality of angled cuts along each longitudinal side wall thereof.

20. A method of making a primary for a linear induction motor, said primary being positionable in an elongated rail that is part of an air bearing load support and conveying system, the rail having a transversely curved working surface, said method comprising the steps of:

arranging, laterally adjacent each other, a plurality of elongated, identical, thin ferromagnetic laminations, each lamination including a plurality of rectangular teeth extending along one longitudinal edge thereof with adjacent teeth being separated by a rectangular slot, each tooth having a straight free edge, said laminations being arranged relative to each other to define a plurality of longitudinally spaced core teeth comprises of laterally adjacent lamination teeth;

positioning said laminations so that the free edges of said lamination teeth are longitudinally abutting a transversely curved forming member having a curvature complementary to that of said rail working surface;

holding said laminations together to define a core having a transversely curved edge portion at the free end of each core tooth thereof;

providing elongated air duct means along each side of said core;

applying an electrical winding around selected numbers of adjacent core teeth to form a plurality of separately wound core poles;

electrically connecting together the windings of every third core pole to define three sets of such wound core poles extending along the core; and encapsulating said core, said windings and said air duct means with the resulting primary having a transversely, curved working surface will be colinear with the track working surface.

21. The method of claim 20 wherein said step of providing air duct means includes the step of arranging an annular conduit adjacent each side of said core prior to winding, the windings of said core poles being wound about said conduits.

22. The method of claim 20 wherein said step of creating air duct means includes the step of arranging a cylindrical mandrel, coated with a suitable release agent, adjacent each side of said core, the windings of said core poles being wound about said mandrels, and , following said encapsulating step and curing of the encapsulating material, removing said mandrels so as to leave said air duct means formed in said primary.

23. The method of claim 20 wherein said stp of providing air duct means includes the steps of: arranging rod means adjacent each side of the core prior to winding, the windings of said core poles being wound about said rod means; removing said rod means after winding to define an elongated cavity on each side of said core; filling each cavity with a fluid, solidifiable material; effecting said encapsulation step after said material has solidified; and removing said material after said encapsulation step is complete.

24. The method of claim 23 wherein said material is wax

25. The method of claim 20 including the step of molding tapered plugs projecting from each end of the primary for a tight fit in corresponding ports of a multiport rail, said air duct means exiting through corresponding ones of said plugs.

26. The method of claim 20 including the step of securing an end plate at each end of said primary by way of anchor means molded into the encapsulating means, said end plate having apertures alignable with said air duct means and connecting bolts for attachment to corresponding connection spline means of the multiport rail.

* * * * *